(12) United States Patent
Johnson et al.

(10) Patent No.: US 10,864,585 B2
(45) Date of Patent: Dec. 15, 2020

(54) MACHINING SYSTEM FOR TURBOMACHINE DOVETAIL

(71) Applicant: General Electric Company, Schenectady, NY (US)

(72) Inventors: Phillip Charles Johnson, Goshen, NY (US); Robert Charles Malison, Schenectady, NY (US); John Matthew Sassatelli, Valley Falls, NY (US)

(73) Assignee: General Electric Company, Schenectady, NY (US)

( * ) Notice: Subject to any disclaimer, the term of this patent is extended or adjusted under 35 U.S.C. 154(b) by 748 days.

(21) Appl. No.: 15/457,094

(22) Filed: Mar. 13, 2017

(65) Prior Publication Data

US 2018/0257189 A1 Sep. 13, 2018

(51) Int. Cl.
| | |
|---|---|
| *F01D 25/28* | (2006.01) |
| *F01D 5/00* | (2006.01) |
| *B23B 47/28* | (2006.01) |
| *B23H 1/00* | (2006.01) |
| *B23H 9/10* | (2006.01) |
| *B23D 75/00* | (2006.01) |

(Continued)

(52) U.S. Cl.
CPC ............ *B23D 75/00* (2013.01); *B23B 47/28* (2013.01); *B23K 26/382* (2015.10); *F01D 5/005* (2013.01); *F01D 5/3046* (2013.01); *F01D 5/3053* (2013.01); *F01D 25/285* (2013.01); *B23B 2215/81* (2013.01); *B23B 2247/12* (2013.01); *B23B 2270/34* (2013.01); *B23H 1/00* (2013.01); *B23H 7/28* (2013.01); *B23H 9/10* (2013.01); *B23H 9/14* (2013.01); *B23K 2101/001* (2018.08); *F05D 2220/31* (2013.01); *F05D 2230/12* (2013.01); *F05D 2230/13* (2013.01)

(58) Field of Classification Search
CPC ... B23H 9/00; B23H 1/00; B23H 7/28; B23H 9/10; B23H 9/14; B32H 9/10; B23K 26/389; B23K 26/384; B23K 2101/001; B23K 26/382; B32K 37/0426; F01D 5/005; F01D 25/285
USPC ..... 219/69.15, 69.2, 69.17, 121.7, 158, 161; 205/665

See application file for complete search history.

(56) References Cited

U.S. PATENT DOCUMENTS

| | | |
|---|---|---|
| 3,823,643 A | 7/1974 | Feucht et al. |
| 3,884,122 A | 5/1975 | Chernov et al. |

(Continued)

*Primary Examiner* — Serkan Akar
*Assistant Examiner* — Chris Q Liu
(74) *Attorney, Agent, or Firm* — Charlotte Wilson; Hoffman Warnick LLC

(57) ABSTRACT

Various embodiments include a system for machining a hole in a turbine blade. The system can include: a mount for engaging a first side of a turbine rotor, the mount including: a drill plate for coupling with the first side of the turbine rotor, the drill plate having: a body; a feed opening on a first side of the body; a passage extending from the feed opening through the body; and a second opening on a second side of the body, the second opening coupled with the passage and positioned to align with the pre-formed hole in the turbine rotor; an alignment bushing for engaging the pre-formed hole in the rotor at a second side of the rotor; and a cutting device for extending through the body and alignment bushing, the cutting device for machining the hole in the blade, the cutting device aligned along a chamfer axis relative to a primary axis of the turbine rotor.

11 Claims, 2 Drawing Sheets

(51) Int. Cl.
*B23K 26/382* (2014.01)
*F01D 5/30* (2006.01)
*B23H 9/14* (2006.01)
*B23K 101/00* (2006.01)
*B23H 7/28* (2006.01)

(56) References Cited

U.S. PATENT DOCUMENTS

| | | |
|---|---|---|
| 4,400,859 A | 8/1983 | Woythal et al. |
| 5,101,557 A * | 4/1992 | Mueller ............... B23B 47/28 29/889.21 |
| 5,168,608 A | 12/1992 | Fraser et al. |
| 7,500,318 B2 | 3/2009 | Dickinson |
| 8,240,041 B2 | 8/2012 | Thompson et al. |
| 8,402,625 B2 | 3/2013 | Holmes et al. |
| 8,677,591 B2 * | 3/2014 | Corn ................ F01D 25/285 269/73 |
| 8,695,216 B2 | 4/2014 | Davis et al. |
| 2013/0259694 A1 | 10/2013 | Hirano et al. |

* cited by examiner

MACHINING SYSTEM FOR TURBOMACHINE DOVETAIL

FIELD OF THE INVENTION

The subject matter disclosed herein relates to turbomachinery. More particularly, the subject matter disclosed herein relates to maintaining components in turbomachines.

BACKGROUND OF THE INVENTION

Turbomachinery, for example, steam turbomachinery such as steam turbines, are designed to have useable lifetimes that span for years, and even decades. During the course of their lifespan, these machines and their components require repair, replacement and/or maintenance.

Some turbomachines utilize a radial-entry dovetail fit between the rotor and the blades. When replacing turbine blades in these configurations, the holes in new blades are match-machined (e.g., reamed) to existing holes in the turbine rotor. These holes can be subject to high stress during operation due the centrifugal force of the blades. Each row of blades has many (e.g., hundreds) of holes that are machined several times in order to best fit the existing holes in the rotor (e.g., with progressively larger tool diameter to ensure accuracy). Further complicating this process is the fact that the rotor and blades can be formed of distinct materials, which are machined in a common process. This can make precision and control of the machining equipment difficult, as the machining device (e.g., reamer) transitions from one material to another (e.g., low-alloy steel to martensitic stainless steel, or low alloy steel to titanium). Additionally, this process is commonly performed during an outage, making delays inefficient and costly.

Conventional approaches for machining these rotor holes involves manually match-machining (e.g., reaming) holes in new blades with holes in the rotor. In these cases, the operator often strains to feed the drill through the holes and avoid being overpowered if the reamer binds. Additionally, this manual process can be tiring, causing operators to fatigue and consequently fail to form uniform holes. When holes are not uniform, or are too large, they can reduce the lifespan of rotor and/or blades due to material fatigue.

BRIEF DESCRIPTION OF THE INVENTION

Various embodiments include approaches for machining a turbine component. In some cases, a system for machining a hole in at least one turbine blade matingly engaged with a turbine rotor includes: a mount for engaging a first side of the turbine rotor, the mount including: a drill plate for coupling with the first side of the turbine rotor, the drill plate having: a body; a feed opening on a first side of the body; a passage extending from the feed opening through the body; and a second opening on a second side of the body, the second opening coupled with the passage and positioned to align with the pre-formed hole in the turbine rotor; an alignment bushing for engaging the pre-formed hole in the turbine rotor at a second side of the turbine rotor, opposite the first side of the turbine rotor; and a cutting device for extending through the body and the alignment bushing, the cutting device for removing a portion of the turbine blade to machine the hole in the at least one turbine blade, the cutting device aligned along a chamfer axis relative to a primary axis of the turbine rotor.

A second aspect of the disclosure includes a method including: mounting a machining system on a turbine rotor, the machining system having: a mount for engaging a first side of the turbine rotor, the mount including: a drill plate for coupling with the first side of the turbine rotor, the drill plate having: a body; a feed opening on a first side of the body; a passage extending from the feed opening through the body; and a second opening on a second side of the body, the second opening coupled with the passage and positioned to align with the pre-formed hole in the turbine rotor; an alignment bushing for engaging the pre-formed hole in the turbine rotor at a second side of the turbine rotor, opposite the first side of the turbine rotor; and a cutting device for extending through the body and the alignment bushing; and actuating the cutting device to machine a hole in the at least one turbine blade, the cutting device aligned along a chamfer axis relative to a primary axis of the turbine rotor.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
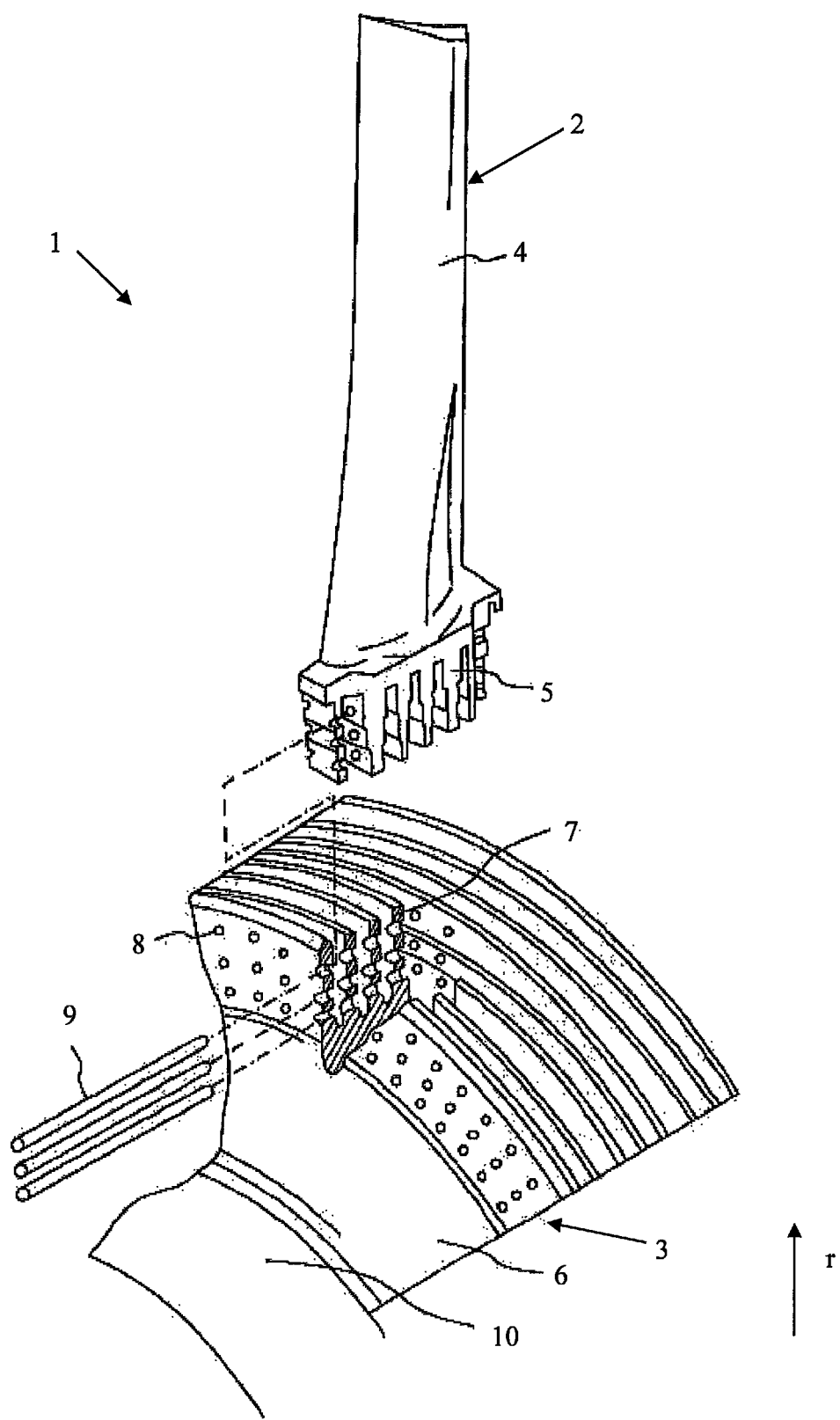
FIG. 1 shows a schematic depiction of a portion of a turbine rotor and corresponding blade.

It is noted that the drawings of the various aspects of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As indicated herein, the subject matter disclosed relates to turbomachinery. More particularly, the subject matter disclosed herein relates to performing maintenance (e.g., repair or replacement) on components in turbomachines.

In the following description, reference is made to the accompanying drawings that form a part thereof, and in which is shown by way of illustration specific example embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely illustrative.

FIG. 1 is a schematic depiction showing a section of a turbomachine (turbine) blade attachment base (or simply, turbomachine) 1. Turbomachine 1 includes a turbine blade 2 (representing a set of blades, not shown) and a rotor 3. Each turbine blade 2 has a blade section 4, which during operation, receives a fluid (e.g., steam) flow and converts the energy of the fluid flow into rotational energy for the turbine. Each blade 2 also includes a blade dovetail root (or, radial entry dovetail) 5 for coupling with rotor 3. Rotor 3 has a turbine shaft 10 and a rotor disc 6 located circumferentially over turbine shaft 10. A rotor dovetail root 7 extends radially from rotor disc 6.

Blade dovetail root 5 of turbine blade 2 and rotor dovetail root 7 of rotor 3 are arranged to matingly engage (i.e., mesh) with each other. Blade dovetail root 5 and rotor dovetail root 7 have pin insertion holes 8 extending therethrough in an axial direction (direction parallel with axis of rotation of rotor 3). Coupling pins 9 are designed to be inserted into pin insertion holes 8, thereby filling pin insertion holes 8 and fixing turbine blade 2 to turbine rotor 3.

When the turbine rotates, causing a centrifugal force in a radial direction (r) to work on turbine blade 2, coupling pins 9 counter that centrifugal force and keep turbine blade 2 coupled to turbine rotor 3. Further, during rotation of rotor 3, a circumferential tensile stress is generated over the inner surface of each pin insertion hole 8, which can cause damage to the inner surface, e.g., increasing the risk of fatigue on that inner surface. As such, conventional approaches have focused on machining accuracy and surface finishes in forming and machining pin insertion holes 8. For example, in conventional approaches of forming/machining pin insertion holes 8 through the turbine blade attachment base, holes 8 are drilled through the turbine rotor 3 and the turbine blade 2 with their dovetail roots 5, 7 meshed with each other, then the drilled holes 8 are reamed to achieve target fitting accuracy and surface roughness.

This conventional approach has several shortcomings. For example, the conventional approach involves manually match-machining (e.g., reaming) holes 8 in new blades 2 with holes 8 in rotor 3. In these cases, the operator often strains to feed the drill through holes 8 and avoid being overpowered when the reamer binds. Additionally, this manual process can be tiring, causing operators to fatigue and consequently fail to form uniform holes 8. When holes 8 are not uniform, or are too large, they can reduce the lifespan of rotor 3 and/or blades 2 due to material fatigue.

In contrast to conventional approaches, various aspects of the disclosure include a self-aligning machining system for a turbine. The self-aligning machining system includes an alignment bushing coupled with a cutting device, such as a cylindrical cutter. In some cases, the cylindrical cutter includes a reamer, an electrical discharge machining (EDM) rod or a laser. According to various embodiments, the self-aligning machining system is a portable system that can be installed and used without a separate alignment process. It is understood that the machining systems described herein can be utilized to machine (e.g., finish) holes 8 in blades 2 after an initial hole has been formed). That is, the machining systems described herein can be used to align holes 8 in blades 2 with holes 8 in rotor 3 as part of a larger maintenance process. It is further understood that the machining systems described herein can aid in carrying and/or balancing the thrust reaction and torsional reaction loads from the machining process, which are normally transferred to the operator. That is, the machining systems described herein can be configured to counteract thrust reaction and/or torsional reaction loads from the cutting device, e.g., during machining.

Figure 2:
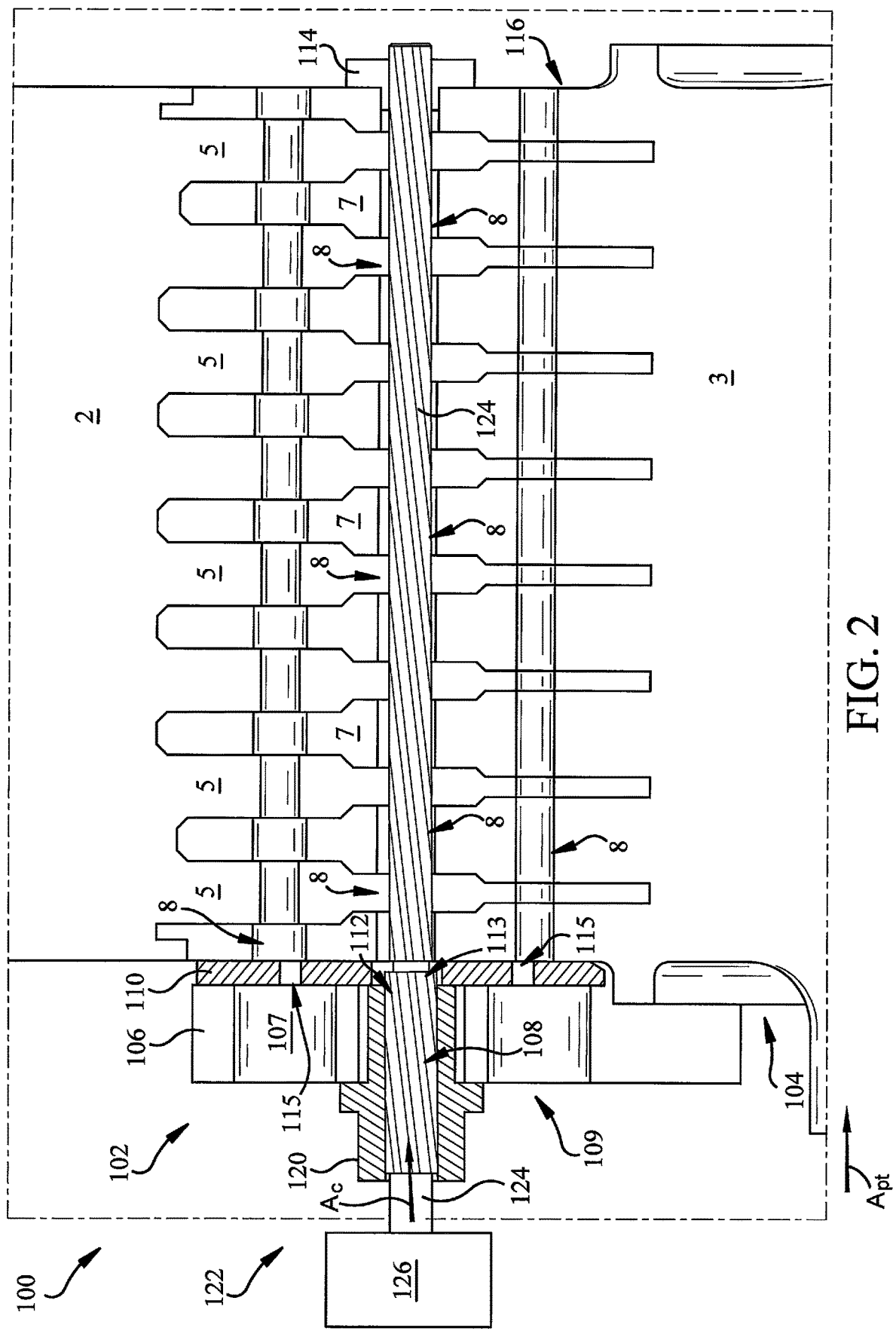
FIG. 2 shows a schematic depiction of a machining system in conjunction with a portion of the turbine rotor of FIG. 1, according to various embodiments of the disclosure.

FIG. 2 shows a schematic depiction of a machining system (system) 100 for machining a hole (e.g., hole 8) in at least one turbine blade 2 matingly engaged (e.g., fit together at complementary component) with a turbine rotor 3 (FIG. 1). As discussed with reference to FIG. 1, in various embodiments, system 2 can address shortcomings of the conventional approaches for machining hole(s) 8 in turbine blade 2 to align hole(s) 8 with corresponding hole(s) in rotor 3.

According to various embodiments, system 100 includes a mount 102 sized to engage a first side 104 of rotor 3. Mount 102, according to various embodiments, can include a drill plate 106 for coupling with first side 104 of rotor 3, e.g., directly coupling such as mechanically fastening (e.g., via bolts, screws, pins or brackets) or adhering. In some cases, drill plate 106 includes a body 107 having a feed opening 108 on a first side 109 of the body 107. Connected with feed opening 108 is a passage extending through body 107. Body 107 can also include a second side 111, opposing first side 109, and a second opening 112 coupled with passage and positioned to align with a pre-formed hole 8 in rotor 3.

Mount 102 can be formed of a metal, such as steel, aluminum, or other suitable metals or alloys, or may be formed of a composite material. In some particular cases, mount 102 can include hardened steel (e.g., hardened tool steel), aluminum (e.g., with hardened bushings) or nylon (including compatible bushings).

In some optional cases, system 100 can also include a spacer 110 sized to fit between drill plate 106 and first side 104 of rotor 3. Spacer 110 can include a sheet or ply of material, e.g., a metal, alloy or composite discussed herein (e.g., bronze or aluminum), and can include a first opening 113 positioned to align with second opening 112 and pre-formed hole 8 in rotor 3. In some cases, as discussed further herein, spacer 110 can further include at least one additional opening 115 having a primary axis substantially perpendicular to the first opening 113, where the additional opening(s) 115 are separated from first opening 113 to align with at least one additional pre-formed hole 8 in rotor 3. In these optional cases, spacer 110 can be used to roughly align drill plate 106 with hole(s) 8 in rotor 3. In these cases, spacer 110 can include a plurality of additional openings 115 which are spaced to roughly align with holes 8 in rotor 3, e.g., such that at least a portion of these openings 115 overlaps with a corresponding hole 8 in rotor 3. In various embodiments, spacer 110 is coupled with drill plate 106 and/or first side 104 of rotor 3 via direct coupling such as mechanically fastening (e.g., via bolts, screws, pins or brackets) or adhering. In other embodiments, spacer 110 can include multiple parts, e.g., a spacer such as a flat spacer, and a bushing extending through an opening in the spacer (e.g., first opening 113) with an axial clearance for receiving a cutting device as described herein. In various embodiments, spacer 110 separates drill plate 106 from first side 104 of rotor 3, and can provide clearance for portions of rotor 3 which are machined away to fall from holes 8.

System 100 can further include an alignment bushing 114 sized to engage the pre-formed hole 8 in rotor 3 at a second side 116 (opposite first side 104) of rotor 3. In various embodiments, alignment bushing 114 is configured to line the pre-formed hole 8 in rotor at second side 116 of rotor 3. As described herein, alignment bushing 114 is configured to support a cutting device during machining of hole 8 in blade 2. In some cases, system 100 can also include a feed bushing 120 sized to line feed opening 108 in drill plate 106. In various embodiments, bushings 114, 120 are formed of any metal, alloy or composite noted herein. In some particular cases, alignment bushing 114 can include brass, bronze, aluminum or a hard plastic such as Polytetrafluoroethylene (PTFE), and feed bushing 120 can include steel (e.g., hardened steel). Bushings 114, 120 act as liners for hole 8 in rotor 3 and feed opening 108, respectively.

According to various embodiments, system 100 can further include a cutting device 122 sized to extend through body 107 (including feed opening 108 and second opening 112) and alignment bushing 114. Cutting device 122 is configured to remove a portion of turbine blade 2 to machine hole(s) 8 in that blade 2. In some cases, cutting device 122 extends through both feed bushing 120 and alignment bushing 114, where it is held in place during the machining process. As described herein, cutting device 122 is configured to machine hole 8 in blade 2 to align that hole 8 with the pre-formed hole 8 in rotor 3. That is, according to various embodiments, cutting device 122 is inserted through hole(s) 8 in the dovetail roots(s) 5 of blade 2, as well as through bushings 114, 120, and is subsequently actuated to machine away a portion of dovetail roots(s) 5, forming holes 8 until the profile of hole 8 in blade 2 matches or nearly matches the profile of hole 8 in turbine 3. In some cases, cutting device 122 includes a cutting member 124 for abrading, cutting or otherwise machining blade 2 at location of hole 8. Cutting member 124 can be coupled with a driving mechanism 126, e.g., for moving cutting member 124 or otherwise causing cutting member to machine blade 2 as described herein. In some cases, cutting device 122 includes a power reaming device such as a rotary reamer or drill, including a bit coupled with a driving mechanism. In some cases, cutting device 122 includes a laser cutting device with a laser light source, power source and gain medium. In still other embodiments, cutting device 122 includes an electrical discharge machining (EDM) rod. According to various embodiments, cutting device 122, and in particular, cutting member 124, is aligned on a chamfer axis ($A_c$) that is off-set from the primary axis $A_{pt}$ of turbine 3 (i.e., the horizontal axis about which turbine 3 rotates), such that these axes are slightly off-set relative to one another. This offset can allow an operator, e.g., a human operator, to rest cutting device 122 on drill plate 106, and perform a machining process as described herein.

According to various embodiments, machining system 100 can be utilized in a method of machining holes 8 in turbine blades 2. In some cases, a method can include:

Process P0 (optional pre-process): inserting dovetail roots 5 of blade 2 such that they mesh with corresponding dovetail roots 7 of rotor 3. In some cases, this process can include pre-machining portions of holes 8 in blade 2 such that they roughly align with holes 8 in rotor 3.

Process P1: mounting machining system (system) 100 on turbine rotor 3. As noted herein, this can include coupling mount 102 and (optionally, spacer 110) to first side 104 of rotor 3, and inserting alignment bushing 114 into hole 8 a second side 116 of rotor 3. This process may further include inserting feed bushing 120 into feed opening 108 and second opening 112 in drill plate 106, however, feed bushing 120 may already be inserted or otherwise integral with drill plate 106 at this time. This process can further include inserting cutting device 122 through feed bushing 120, holes 8 in rotor 3, and alignment bushing 114. As noted herein, mounting system 100 can include aligning cutting device 122, and in particular, cutting member 124 along chamfer axis ($A_c$) which is off-set from primary axis ($A_{pt}$) of turbine 3.

Process P2: actuating cutting device 122 to machine hole 8 in turbine blade 2. According to various embodiments, cutting device 122, and in particular, cutting member 124, can cut, ream or otherwise abrade an inner surface of hole 8 in blade 2 to machine that surface. Cutting device 122 (in particular, cutting member 124) extends through feed bushing 120 and alignment bushing 114, and due to the off-set between cutting member 124 at chamfer axis ($A_c$) the primary axis ($A_{pt}$) of rotor 3, cutting device 122 may allow an operator to continuously perform machining processes with precision and without significant fatigue. Actuating cutting device 122 can include machining hole 8 in blade(s) 2 to align that hole 8 with the pre-formed hole 8 in rotor 3. As discussed herein, when machining holes 8 in blade(s) 2 and rotor 3, cutting member 124 may transfer a reaction load (e.g., a thrust reaction load and/or torsional reaction load) to drill plate 106 and driving mechanism 126 (and in some cases, spacer 110). In conventional systems, this reaction load is commonly transferred to the operator of the driving mechanism 126, which can cause operator fatigue and/or cutting error. However, due to the positioning of drill plate 106 and feed bushing 120 (and in some cases, spacer 110), along with alignment bushing 114, system 100 can carry a portion of the weight of cutting device 122 and counteract the reaction load from cutting member 124 and driving mechanism 126.

In various embodiments, processes P1 and P2 are performed sequentially without an intervening alignment process. That is, the processes of mounting the machining system 100 and then actuating cutting device 122 can be performed without performing a separate alignment process. In this sense, machining system 100 is a self-aligning system. However, in other embodiments, an intervening alignment process could be performed, including, for example, placing at least one alignment pin (not shown) proximate rotor 3 to align machining system 100 with rotor 3 and/or holes 8 in rotor 3. In these embodiments, drill plate 106 can have at least one degree of freedom (DOF), and include a corresponding locking mechanism(s) for this DOF that is constrained by the alignment pin in order to match the orientation of hole(s) 8 in rotor 3. Mount 102 could then be locked in place to coincide with the orientation of the alignment pin(s).

In various embodiments, processes described herein can be iterated (repeated) periodically (e.g., according to schedule of x times per y period, and/or continuously) in order to aid in reaming of one more portion(s) of one or more (turbomachine) blade(s) 2. In some cases, one or more of the processes described herein can be repeated, for example, for a set of blades 2 (e.g., blades).

It is understood that in the processes described herein, other processes may be performed while not being explicitly described, and the order of processes can be rearranged according to various embodiments. Additionally, intermediate processes may be performed between one or more described processes. The flow of processes described herein is not to be construed as limiting of the various embodiments.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:
1. A method comprising:
    mounting a machining system on a turbine rotor, the turbine rotor including a pre-formed hole, the machining system having:
        a mount for engaging a first side of the turbine rotor, the mount including:
            a drill plate for coupling with the first side of the turbine rotor, the drill plate having: a body; a feed opening on a first side of the body; a passage extending from the feed opening through the body; and a second opening on a second side of the body, the second opening coupled with the passage and positioned to align with the pre-formed hole in the turbine rotor;

an alignment bushing for engaging an interior surface of the pre-formed hole in the turbine rotor at a second side of the turbine rotor, opposite the first side of the turbine rotor; and a cutting device for extending through the body and the alignment bushing, the cutting device aligned along a chamfer axis relative to a primary axis of the turbine rotor; and actuating the cutting device to machine a hole in at least one turbine blade of the turbine rotor, wherein actuating the cutting device includes machining the hole in the at least one turbine blade to align the at least one hole with the pre-formed hole in the turbine rotor, wherein the mount and the alignment bushing are configured to counter a reaction load from the cutting device during the machining of the hole in the at least one turbine blade.

2. The method of claim 1, wherein the machining system further includes a feed bushing, the mounting further including inserting the feed bushing in the feed opening in the drill plate.

3. The method of claim 2, wherein the cutting device extends through the feed bushing during the actuating of the cutting device.

4. The method of claim 1, wherein the mounting includes aligning the cutting device along the primary axis of the feed opening and the second opening.

5. The method of claim 1, wherein the alignment bushing is sized to line the pre-formed hole in the turbine rotor at the second side of the turbine rotor, the mounting including inserting the alignment bushing in the pre-formed hole and placing the cutting device inside the alignment bushing prior to actuating the cutting device.

6. The method of claim 1, wherein the cutting device includes at least one of a power reaming device, an electrical discharge machining (EDM) rod or a laser device.

7. The method of claim 1, further comprising an intervening alignment process, wherein the intervening alignment process includes placing at least one alignment pin proximate the turbine rotor to align the machining system.

8. The method of claim 1, wherein the mount and the alignment bushing support a portion of a weight of the cutting device during the actuating of the cutting device.

9. A method comprising:
mounting a machining system on a turbine rotor, the turbine rotor including a pre-formed hole, the machining system having:
a mount for engaging a first side of the turbine rotor, the mount including:
a drill plate for coupling with the first side of the turbine rotor, the drill plate having: a body; a feed opening on a first side of the body; a passage extending from the feed opening through the body; and a second opening on a second side of the body, the second opening coupled with the passage and positioned to align with the pre-formed hole in the turbine rotor;
an alignment bushing for engaging an interior surface of the pre-formed hole in the turbine rotor at a second side of the turbine rotor, opposite the first side of the turbine rotor; and
a cutting device for extending through the body and the alignment bushing, the cutting device aligned along a chamfer axis relative to a primary axis of the turbine rotor; and
actuating the cutting device to machine a hole in the at least one turbine blade of the turbine rotor, wherein the mounting of the machining system and the actuating of the cutting device are performed sequentially without an intervening alignment process.

10. The method of claim 9, wherein the drill plate includes at least one degree of freedom, and the mount further includes a corresponding locking mechanism through which an orientation of the at least one alignment pin is transferred to at least one degree of freedom of the drill plate and maintained after removing of the alignment pin.

11. The method of claim 9, wherein the alignment bushing is sized to line the pre-formed hole in the turbine rotor at the second side of the turbine rotor, the mounting including inserting the alignment bushing in the pre-formed hole and placing the cutting device inside the alignment bushing prior to actuating the cutting device.

* * * * *